(12) United States Patent
Cloos et al.

(10) Patent No.: US 10,378,682 B2
(45) Date of Patent: Aug. 13, 2019

(54) HIGH PRESSURE PIPE COUPLING CONSTRUCTION, AS WELL AS METHOD FOR FORMING SAID COUPLING CONSTRUCTION

(71) Applicant: Pipelife Nederland B.V., Enkhuizen (NL)

(72) Inventors: Peter Jeroen Cloos, Enkhuizen (NL); Mark Jeroen Bruin, Wervershoof (NL)

(73) Assignee: Pipelife Nederland B.V., Enkhuizen (NL)

( * ) Notice: Subject to any disclaimer, the term of this patent is extended or adjusted under 35 U.S.C. 154(b) by 535 days.

(21) Appl. No.: 14/939,355

(22) Filed: Nov. 12, 2015

(65) Prior Publication Data
US 2016/0131287 A1  May 12, 2016

(30) Foreign Application Priority Data

Nov. 12, 2014  (EP) ..................................... 14003801

(51) Int. Cl.
*F16L 13/14* (2006.01)
*F16L 33/207* (2006.01)
(Continued)

(52) U.S. Cl.
CPC ........... *F16L 13/141* (2013.01); *F16L 13/143* (2013.01); *F16L 33/01* (2013.01); *F16L 33/2075* (2013.01);
(Continued)

(58) Field of Classification Search
CPC ....... F16L 13/141; F16L 13/143; F16L 47/00; F16L 23/024; F16L 33/2075; F16L 33/2076; Y10T 29/49826
(Continued)

(56) References Cited

U.S. PATENT DOCUMENTS

| | | | | | |
|---|---|---|---|---|---|
| 2,940,778 | A | * | 6/1960 | Kaiser | ..................... F16L 33/01 |
| | | | | | 285/222.2 X |
| 3,188,117 | A | * | 6/1965 | Press | ......................... 138/109 X |

(Continued)

FOREIGN PATENT DOCUMENTS

| | | | |
|---|---|---|---|
| DE | 20 2008 007137 U1 | 10/2008 | |
| DE | 20 2011 107346 U1 | 9/2012 | |

(Continued)

OTHER PUBLICATIONS

EP Search Report, dated Feb. 3, 2015, from corresponding EP application.

*Primary Examiner* — Greg Binda
*Assistant Examiner* — Zachary T Dragicevich
(74) *Attorney, Agent, or Firm* — N.V. Nederlandsch Octrooibureau; Catherine A. Shultz; Katelyn J. Bernier

(57) ABSTRACT

A high pressure pipe coupling construction includes at least one high pressure pipe (2) as well as a coupling (22) connected to the pipe (2). The pipe consists a reinforcement layer (4) of helically arranged fibers (6, 7) and the coupling (22) consists an inner sleeve (23) sealed with respect to the inner surface of the pipe and at least one metal outer sleeve (9). The metal outer sleeve (9) has an overlapping outer sleeve part (29) overlapping the inner sleeve (23) in axial direction and a protruding outer sleeve part (25) protruding in axial direction with respect to the inner sleeve (23), which overlapping outer sleeve part (29) and protruding outer sleeve part (25) are connected to the outer surface of the pipe (2). The inner sleeve (23) consists of a plastic material; at the location of overlap between the inner sleeve (23) and the pipe (2), the maximum outer diameter of the inner sleeve (23) is smaller than or equal to the minimum inner diameter of the pipe (2).

9 Claims, 3 Drawing Sheets

(51) Int. Cl.
*F16L 47/00* (2006.01)
*F16L 33/01* (2006.01)
*F16L 23/024* (2006.01)

(52) U.S. Cl.
CPC .......... *F16L 33/2076* (2013.01); *F16L 47/00* (2013.01); *F16L 23/024* (2013.01); *Y10T 29/49826* (2015.01)

(58) Field of Classification Search
USPC ... 285/222.1, 222.2, 222.3, 222.4, 397, 256, 285/21.1, 21.2; 138/109
See application file for complete search history.

(56) References Cited

U.S. PATENT DOCUMENTS

| | | | |
|---|---|---|---|
| 6,361,080 B1 * | 3/2002 | Walsh | F16L 23/024 285/222.1 X |
| 6,902,205 B2 * | 6/2005 | Bouey | |
| 2007/0296209 A1 * | 12/2007 | Conley | F16L 13/143 |
| 2009/0085351 A1 * | 4/2009 | Cloos | F16L 33/01 |
| 2010/0207381 A1 | 8/2010 | Cornut Gentille | |

FOREIGN PATENT DOCUMENTS

| | | |
|---|---|---|
| EP | 2 045 501 A1 | 4/2009 |
| EP | 2 243 992 A1 | 10/2010 |
| FR | 2 920 856 A1 | 3/2009 |
| WO | 2011/053141 A1 | 5/2011 |

\* cited by examiner

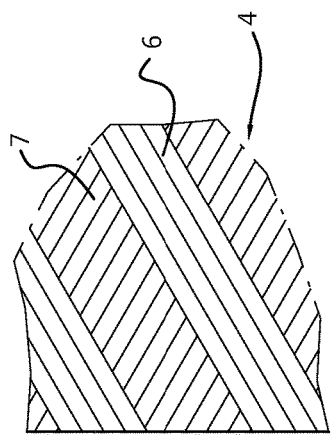
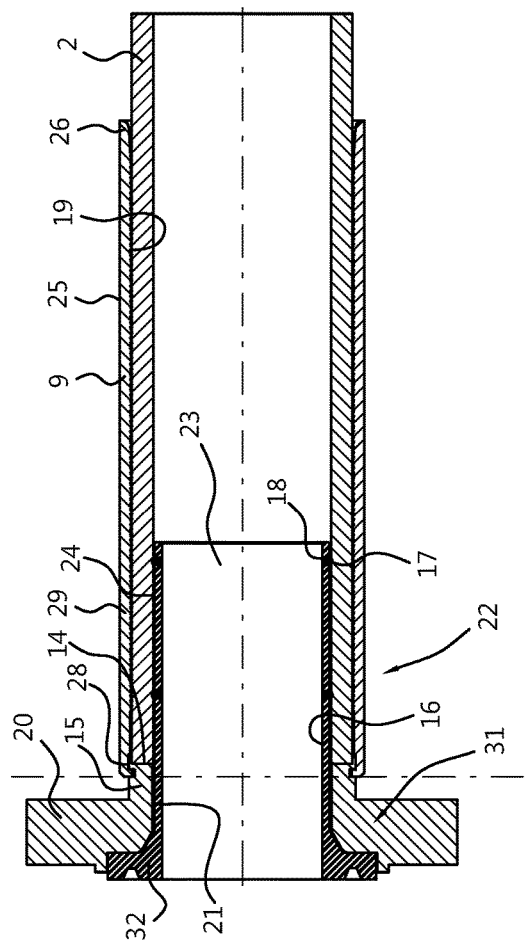

HIGH PRESSURE PIPE COUPLING CONSTRUCTION, AS WELL AS METHOD FOR FORMING SAID COUPLING CONSTRUCTION

FIELD OF THE INVENTION

The invention is related to the field of coupling constructions for high pressure pipes. Such high pressure pipes can be used for transporting various types of fluids; as an example, the transport of crude oil, gas and water is mentioned. Such fluids may have properties which place severe constraints on the materials which can be used for manufacturing the pipes. For instance, steel pipes are prone to corrosion under the influence of the aggressive components of the high pressure crude oil and gas. Similarly, the couplings between the pipe lengths which make up a pipeline, are also vulnerable.

BACKGROUND OF THE INVENTION

EP-A-2243992 discloses a high pressure pipe coupling construction, comprising at least one high pressure pipe as well as a coupling connected to a pipe end of said pipe, said pipe having a pipe wall which comprises a reinforcement layer of helically wound fibers embedded in a matrix material, said coupling comprising at least one metal outer sleeve crimped onto the outer surface of the pipe end and an inner sleeve sealed with respect to the inner surface of the pipe end and overlapping the outer sleeve in axial direction. The metal outer sleeve protrudes in axial direction with respect to the inner sleeve by means of a protruding outer sleeve part which at least partly is clamped onto the outer surface of the pipe.

The pipe of this prior art pipe coupling comprises fibers and matrix materials which are chemically inert with respect to the aggressive components of crude oil and gas. The helically wound character of the fibers furthermore provides a high mechanical strength and stiffness for coping with high internal pressures in a pipeline. Moreover, the relatively long outer sleeve of this prior art coupling favorable influences the mechanical connection and force transfer between the pipe and the coupling, by making use of the so-called capstan effect.

This capstan effect results from the helical path of the fibers or threads within the outer sleeve. This provides a so-called encirclement of the fibers or threads within the outer sleeve. The ends of the fibers are held against sliding or slipping displacements within the pipe wall material. The fibers may be arranged in several fashions. According to a first possibility, the fibers are arranged parallel to each other in the form of a tape. The tape comprises furthermore a plastic matrix material, and is wound helically within the pipe wall. By melting together the plastic material of the tapes and of the coating layer, the fibers are held reliably against slipping with respect to the plastic material. Preferably, several tapes are wound on top of each other with opposite winding angles. The number of tapes in one winding direction is preferably the same as the number of tapes in the opposite winding direction so as to balance the forces in the tapes. Small woven fibre/cord tapes or parallel fibre/cord tapes are braided or wound onto the pipe. The fibre may be applied as woven or parallel tapes. According to a second possibility, relatively narrow tapes are woven into each other. In this embodiment as well, the tapes are wound with opposite winding angles. The fibers may be applied in a braided or knitted fashion within the tapes.

The pipe end itself is fixed by compression of the pipe wall between the outer sleeve and the inner sleeve. As soon as these fibers or threads are subjected to tensile forces as a result of pressures in the pipe, the fibers or threads develop increasing friction forces with respect to the inner surface of the outer sleeve, comparable to the friction forces which develop in a cable which is slung around a capstan. For this holding phenomenon to become effective, it is sufficient to merely prevent the cable from slipping with respect to the capstan, which requires only a low to moderate holding force to be exerted on the free end of the cable. As a result of the capstan effect, a relatively high holding force is obtained in the cable. Similarly, the fibers or threads respectively the strands containing these fibers or threads of the pipe only need to be slightly clamped by exerting a low or moderate clamping force on the ends thereof, for obtaining a relatively high holding force of the pipe end with respect to the outer sleeve.

SUMMARY OF THE INVENTION

The object of the invention is to further improve this prior art high pressure pipe coupling construction so as to increase the resistance against aggressive components of the fluids to be transported. According to a first embodiment, this object is achieved through a high pressure pipe coupling construction, comprising a high pressure pipe as well as a coupling connected to the pipe at a pipe end thereof, said pipe comprising a reinforcement layer of helically arranged fibers, said coupling comprising a non-metallic inner sleeve sealed with respect to the inner surface of the pipe and a metallic outer sleeve connected to the outer surface of the pipe, and a metallic force transfer fitting beyond the pipe end, which force transfer fitting is connected to said outer sleeve and to a mounting means located at the end of the force transfer fitting which faces away from the outer sleeve, wherein the non-metallic inner sleeve extends through the metallic force transfer fitting and through the mounting means and has a seal fitting at the end of the mounting means which faces away from the pipe.

According to a second embodiment, this object is achieved through a high pressure pipe coupling construction, comprising two high pressure pipes as well as a coupling connected to both pipes at the respective facing pipe ends thereof, said pipes each comprising a reinforcement layer of helically arranged fibers, said coupling comprising a non-metallic inner sleeve sealed with respect to the respective inner surfaces of the pipes, and two metallic outer sleeves one of which is connected to the outer surface of one of the pipes and the other of which is connected to the outer surface of the other of the pipes, and a fitting means between the facing pipe ends and connected to said outer sleeves, wherein the fitting means comprises a metallic force transfer fitting connected to the outer sleeves and a seal fitting, wherein the non-metallic inner sleeve comprises said seal fitting which is held between the facing pipe ends.

In the coupling construction according to the invention, use is made solely of the capstan effect with respect to the outer sleeve for obtaining the required high holding force of the pipe in the outer sleeve. The end of the fibers or threads of the pipe wall is initially held by the friction of the strands in the pipe wall material, and/or by being subjected to a slight compression between the inner sleeve and the outer sleeve. Upon increasing the pressure in the pipe, the fibers or threads are firmly compressed against, and held by, the external sleeve. Thus, the external sleeve takes up the tensile forces in the pipe, while the inner sleeve remains free form tensile forces. This is further enhanced by the fact that the outer sleeve has a relatively high modulus of elasticity due to the fact that it consists of metal material, whereas the non-metallic material, such as plastic material of the inner sleeve has only a relatively low modulus of elasticity. The force transfer thus takes place through the load path with a relatively high stiffness of the outer sleeve, the inner sleeve being ineffective in this regard as a result of the force flow through the outer sleeve, and its low modulus of elasticity in comparison to the modulus of elasticity of the metal outer sleeve.

The inner sleeve furthermore does not or hardly contribute to the axial force transfer as a result of the geometric relation between the inner sleeve and the pipe. Preferably, the maximum outer diameter of the inner sleeve is smaller than or equal to the minimum inner diameter of the pipe, no positive force transfer can take place due to lack of surface features which engage each other or which are hooked into each other.

Thus, according to a preferred embodiment the full outer surface of the inner sleeve directly opposite the inner surface of the pipe end facing said inner surface and outside any groove therein can be cylindrical and/or devoid of uneven aspects such as ribs, ridges and the like. The inner sleeve thus will not take part in the transfer of axial forces between the pipe and the coupling, but will merely serve as a sealing sleeve between the pipe ends. Although a slight compression of the pipe wall between the outer sleeve and the inner sleeve may be obtained, e.g. with the aim of starting the capstan effect, the maximum force exerted by the sleeve on the pipe end resulting from friction between the inner sleeve and the pipe wall is at least one order of magnitude smaller than the force exerted by the outer sleeve on the pipe end under the influence of internal pressure in the pipe and the capstan effect.

As a result of the fact that the inner sleeve does not play a significant role, or no role at all, in the transfer of forces, it may completely consist of plastic material. The plastic may be selected with a view on the fluids to be transported, and may in particular be inert with respect to those fluids. The same holds for the material of the sealing rings.

Preferably, at the location of overlap between the inner sleeve and the pipe, the inner surface of the pipe is defined by a cylindrical area the inner diameter of which is larger than the inner diameter of the pipe outside said area of overlap, said cylindrical area being preferably obtained by boring or honing the inner surface of the pipe. The pipe is thereby prepared for receiving the inner sleeve in a well-defined manner, for instance with a precise fit according to a cylinder/piston arrangement. This further highlights that the inner sleeve has a sealing character only, and does not or hardly contribute to the axial force transfer between the pipe and the coupling.

For increasing the sealing effect, the inner sleeve may be provided with at least two circumferential outer grooves each containing a respective sealing ring, said at least two sealing rings being spaced in axial direction with respect to each other and each being held compressed between the inner sleeve and the wall of the pipe end.

The metal outer sleeve may protrude in axial direction with respect to the inner sleeve by means of a protruding outer sleeve part which at least partly is connected to the outer surface of the pipe end. Thereby, the desired capstan effect can be ascertained to develop. As a rule of thumb, it is best in case the length of the outer sleeve is sufficient to cover a piece of pipe the length of which contains one full encirclement of the helically wound fibers. The connected metal outer sleeve part overlapping the inner sleeve as well as the connected protruding outer sleeve part together preferably constitute a continuous connected portion of the metal outer sleeve. Thus, the pipe end over its full length and outer surface is continuously connected to the outer sleeve.

The inner surface of the metal outer sleeve preferably has an uneven or rough surface, such as circumferentially extending teeth, promoting the axial force transfer between the pipe and the coupling. The pipe wall may comprise an outer coating adhered to the reinforcement layer and being conformed to the uneven inner surface of the outer sleeve. Preferably, the metal outer sleeve part a free end facing the other pipe end and the inner surface of which metal outer sleeve is widened radially outwardly. Thereby, the increase in diameter of the pipe under influence of the increasing internal pressures can be accommodated over the widening free end of the outer sleeve, thus avoiding an abrupt diameter change in the pipe which might otherwise initiate cracks or ruptures and the like in the pipe wall.

The outer sleeve may be connected in different ways to the pipe end. According to a first possibility, the outer sleeve is a crimped or swaged outer sleeve connected to the pipe end by means of crimping respectively swaging. Alternatively, the outer sleeves may comprise outer sleeve parts, such as sleeve halves, which are connected to each other through tension bolt connection and which are thus clamped onto the pipe end such as by means of these tension bolt connectors.

The outer sleeve may be connected to a fitting ring which has an abutting surface facing towards and abutting the pipe end and the inner sleeve extends over inner surface of the fitting ring. This coupling construction is carried out in several forms. According to a first possibility, the fitting ring is provided with a radially outwardly extending mounting flange having a radially extending mounting surface facing away from the pipe end, in which case the inner sleeve is extended beyond the outwardly extending mounting flange by means of a radially outwardly extending sealing flange which at least partly covers the radially extending mounting surface of the mounting flange.

According to a second possibility, the coupling construction is used to interconnect two pipes. Thus, the invention is also related to an assembly, comprising axially aligned high pressure pipes the pipe ends of which face each other, as well as a coupling construction as described before, said coupling construction comprising two metal outer sleeves each being connected to a respective pipe end of the aligned high pressure pipes, the facing ends of the metal outer sleeves being connected to the fitting ring, and two non-metallic inner sleeves each being sealed with respect to the inner surface of a respective pipe, the facing ends of the inner sleeves each being connected to each other through the seal fitting and each being provided with at least one circumferential outer groove each containing a respective sealing ring.

In particular, the inner sleeves and the sealing fitting may be carried out as a unity. Said unity may comprise an external land or rim onto which the fitting ring is mounted, the pipe ends each abutting an axially opposite radially extending surface of the land and the fitting ring.

Furthermore, the invention is related to a process for forming a coupling construction, comprising the steps of:
  providing at least one high pressure pipe having a pipe wall which comprises a reinforcement layer of helically wound fibers embedded in a matrix material,
  providing a metal outer sleeve onto the outer surface of the pipe end, providing and an inner sleeve onto the inner surface of the pipe end so as to provide a sealing with respect to the pipe end, e.g. by providing at least one circumferential outer groove in said inner sleeve and providing a sealing ring in said outer groove so as to provide a seal with respect to said inner surface of the pipe end, said inner sleeve comprising a plastic material, making the inner sleeve overlap the outer sleeve in axial direction, after providing the outer sleeve and the inner sleeve onto the pipe end and after making the inner sleeve overlap the outer sleeve, crimping or swaging the outer sleeve onto said pipe end while deforming said pipe end, leaving free the inner surface of the inner sleeve of any tooling thus avoiding the application of radially outwardly directed forces on said inner surface of the inner sleeve.

Furthermore, in the method the step of crimping or swaging the outer sleeve while deforming the pipe end may be ended before elastically or plastically deforming the inner sleeve. However some minor elastic deformation of the inner sleeve may occur as a result of the crimping or swaging operation exerted on the outer sleeve.

From these process steps, it will be clear that the axial force transfer between the pipe and the coupling takes place through the outer sleeve. The inner sleeve does not play an important role in this respect, but merely servers to seal the pipe coupling with respect to the pipe end. Only a slight clamping of the pipe end is necessary for making the pipe firmly cooperate with the outer sleeve as a result of the capstan effect, as explained before.

The fibers of the fiber layer may consist of steel, any high-strength synthetic fiber like high-strength carbon, aramid, PET, glass or other fibers embedded in a reinforcing layer matrix. The liner may consist of polyethylene or nylon. The reinforcement layer matrix preferably consists of the same material, as the coating/cover layer preferably thermoplastic material, most preferably HDPE or PA. The liner material should be flexible and preferably comprise a thermoplastic material, preferably of the same material as the reinforcing layer matrix.

It is not always necessary to apply reinforcing fiber layers which are embedded in a matrix. In case bare reinforcing fiber layers are applied without a matrix, these should be mechanically coupled to the cover layer. e.g. through the uneven surface of the fibers which are e.g. braided.

BRIEF DESCRIPTION OF THE DRAWINGS

The invention will now be described further with reference to the embodiments shown in the drawings.

FIG. 2 shows a pipe with pipe coupling and flange.

FIG. 3 shows a view of the fiber orientation,

DETAILED DESCRIPTION OF THE INVENTION

Figure 1:
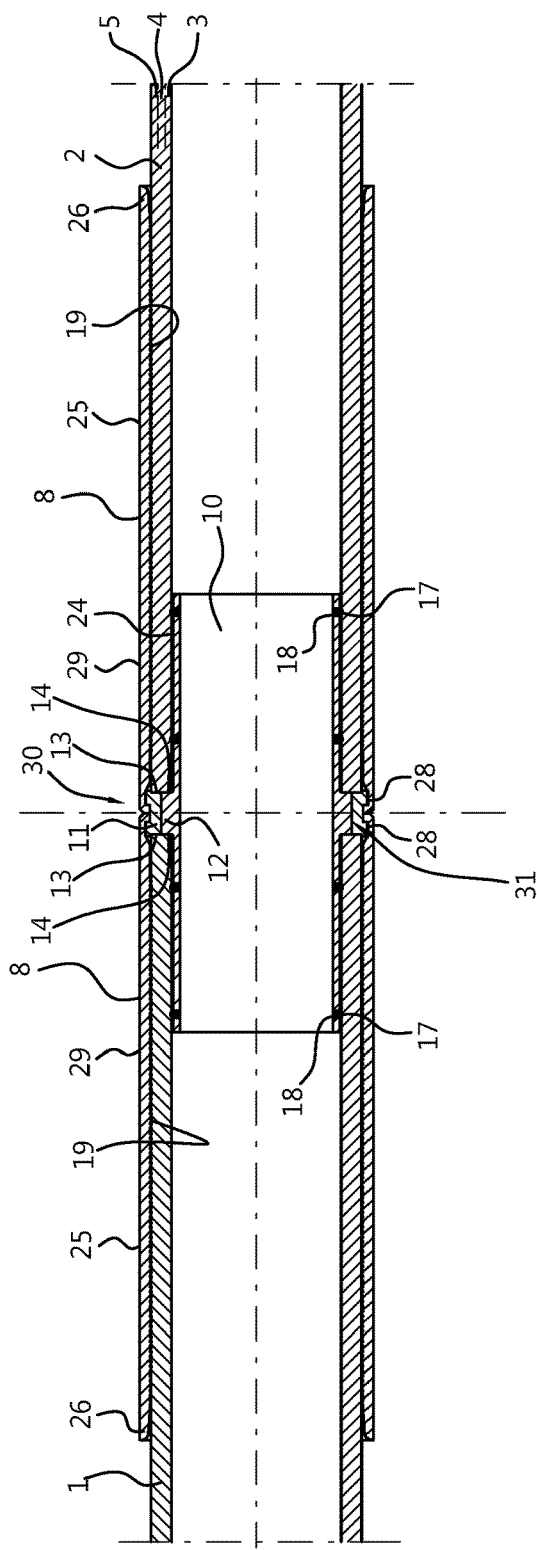
FIG. 1 shows an assembly of two pipes interconnected through a coupling construction.

The assembly of FIG. 1 consists of two pipe lengths only the pipe ends 1, 2 of which are shown. The pipe lengths both have a pipe wall which consist of an inner liner 3, a layer 4 of helically wound fibers and an outer layer or coating 5. Part of the fiber layer 4 is shown in FIG. 3, showing the helically wound fibers 6, 7 at opposite angles. Preferably, these angles amount to about plus and minus 54° as shown in FIG. 3.

The pipe ends 1, 2 are connected to each other through the pipe coupling 30, which comprises two metal outer sleeves 8, a plastic inner sleeve 10 and the fitting means 31. The inner sleeve 10 is provided with the seal fitting 12 forming a unity with the sleeve. Said seal fitting 12 forms a part of the fitting means 31. The inner sleeve 10 has outer grooves 18, which each contain a sealing ring 17. These sealing rings 17 are held compressed between the inner sleeve 10 and the inner surface or liner 3 of the pipe walls. Thus, the fluid transported is only in contact with the inner liner 3 and the plastic inner sleeves 10 and seal fitting 12 of the assembly. In particular, the inner sleeve 10 has four outer grooves 18 each with a sealing ring 17.

The transfer of axial forces between the pipes is obtained by the outer sleeves 8, which are interconnected through the fitting ring 11 which forms the other part of the fitting means 31. In the embodiment shown, the outer sleeves 8 are hooked onto the fitting ring 11 by means of the hook connections 28, however other ways of connection are possible as well, such as a welded connection. The fitting ring 11 in the embodiment shown is sitting around a seal fitting 12 in the middle of the inner sleeve 10. The fitting ring 11 and the seal fitting 12 provide opposite stop faces 13, 14 against which the pipe ends 1, 2 are resting.

The outer sleeves 8 have a part 29 overlapping the inner sleeve 10, as well as a part 25 protruding with respect to the inner sleeve 10. The length of the overlapping and the protruding parts 29, 25 of the outer sleeves 10 are important for the axial force transfer between the pipe lengths. Furthermore, the free end 26 of the outer sleeves is widened, for instance in a trumpet shape. This shape enables an easy insertion of the pipe ends 1, 2, and also allows the radial expansion of the pipes under the influence of the internal pressures to take place gradually over a certain axial length. Thereby, the occurrence of incisions in the outer coating of the pipe lengths is prevented.

The assembly as shown in FIG. 1 is made up as follows. The outer sleeves 8 are connected to the fitting ring 11. One part of the inner sleeve 10 is fitted within one of the pipe ends 1, 2 and subsequently one of the outer sleeves 8 is fitted over said pipe end whereby the fitting ring 11 is slid over the land 12. Subsequently, the other pipe end is slid between the other outer sleeve and the other part of the inner sleeve. Next, the outer sleeves are subjected to a crimping or swaging operation, in such a way that they are compressed against the coating layer 5 of the pipe ends 1, 2. The outer sleeves are provided with inner teeth 19, in such a way that upon crimping or swaging the outer sleeves, these teeth penetrate into the coating layer 5 and a firm connection is obtained.

The inner sleeve however is maintained in its original form, virtually without being compressed with respect to the pipe ends and thus merely serve to seal the pipe ends with respect to each other, generally without taking part in the transfer of forces between the pipe ends. Thus, the outer surface 24 of the inner sleeve 10 which directly face the opposite inner surfaces of the pipes 1, 2 is completely cylindrical and devoid of teeth, ridges and the like, outside the area thereof occupied by the grooves 18.

The embodiment of FIG. 2 shows a pipe end 2 with a flange coupling 22. This embodiment comprises in general half of the components according to FIG. 1, now with a flange 20 connected in one piece to the fitting ring 15 onto which the outer sleeve 9 is mounted by a hook connection. The inner sleeve 23 has two outer grooves 18 each containing a sealing ring 17. This inner sleeve 23 furthermore is extended past the mounting flange 20 with a sealing flange 21. The mounting flange is to be connected to a counter flange, e.g. from a vessel or from another pipe end, by means of tension bolts. The sealing flange provides the sealing action and at the same time shields the flange from aggressive fluids.

Figure 4:
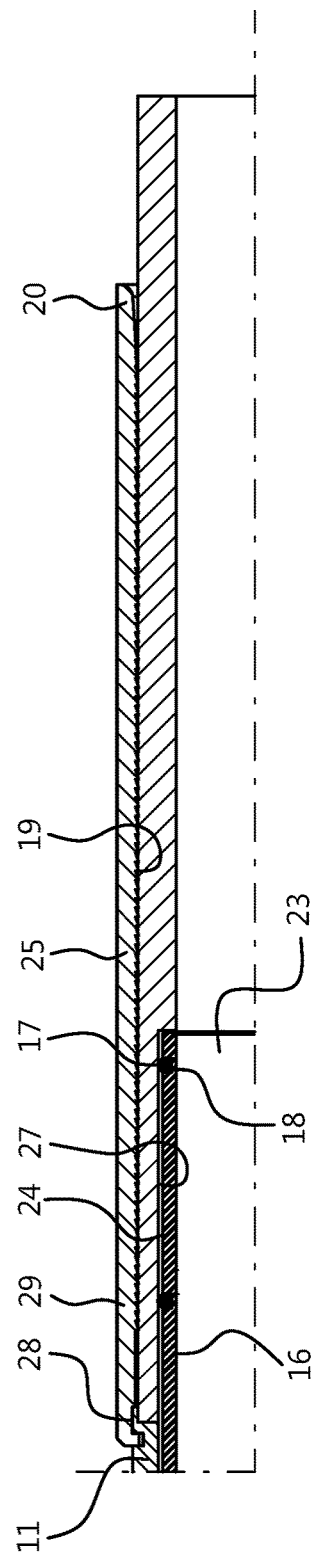
FIG. 4 shows a further embodiment.

The embodiment of FIG. 4 shows a pipe with an end the internal surface of which has been obtained by partly boring or honing away the wall material. Thereby, a recessed cylindrical part 27 has been obtained. The diameter of this recessed cylindrical part 27 is selected in such a way that the inner sleeve 16 fits precisely, comparable to a piston in a cylinder. It is also possible to fit the inner sleeve with some play in case the diameter of the recessed part is selected slightly larger than the outer diameter of the inner sleeve. In all these case however, the sealing ring 17 must be held compressed between the inner sleeve 16 and the pipe 1, 2.

LIST OF REFERENCE NUMERALS

1., 2. Pipe
3. Inner liner
4. Fiber layer
5. Coating
6., 7. Fibers
8., 9. Outer sleeve
10. Unity of inner sleeves and seal fitting
11. Fitting ring
12. Land
13., 14. Stop face
15. Fitting ring
17. Sealing ring
18. Groove
19. Teeth
20. Mounting flange
21. Sealing flange
22. Flange coupling
23. Inner sleeve
24. Outer surface of inner sleeve
25. Protruding part of outer sleeve
26. Widened end of outer sleeve
27. Cylindrical part of pipe
28. Hook connection
29. Overlapping part of outer sleeve
30. Pipe coupling
31. Fitting means

The invention claimed is:

1. A high pressure pipe coupling construction comprising:
two high pressure pipes;
a coupling connected to both pipes at the respective facing pipe ends thereof; and
a metallic force transfer fitting;
wherein the pipes each comprise a reinforcement layer of helically arranged fibers;
wherein the coupling comprises a non-metallic inner sleeve sealed with respect to the respective inner surfaces of the pipe and two metallic outer sleeves one of which is connected to an outer surface of one of the pipes and the other of which is connected to an outer surface of the other of the pipes;
wherein the non-metallic inner sleeve has a seal fitting which is held between the facing pipe ends; and
wherein the metallic force transfer fitting is connected to at least one metallic outer sleeve and to a mounting means;
wherein the non-metallic inner sleeve extends through the metallic force transfer fitting and through the mounting means; and
wherein the seal fitting faces away from both pipes at an end of the mounting means.

2. The pipe coupling according to claim 1, wherein the seal fitting and the inner sleeve form a single unity.

3. The pipe coupling according to claim 1, wherein the seal fitting extends over or adjoins the inner surface of a fitting ring.

4. The pipe coupling according to claim 1, wherein the inner sleeve and the respective pipe solely cooperate with each other through a sliding fit or a friction fit.

5. The pipe coupling according to claim 1, wherein the metallic outer sleeve comprises an overlapping outer sleeve part overlapping the inner sleeve in axial direction and a protruding outer sleeve part protruding in axial direction with respect to the inner sleeve, and
wherein the overlapping outer sleeve part and the protruding outer sleeve part are connected to the outer surface of the pipe.

6. The coupling construction according to claim 1, wherein at a location of overlap between the inner sleeve and the pipe, the inner surface of the pipe is defined by a cylindrical area the inner diameter of which is larger than the inner diameter of the pipe outside the location of overlap, said cylindrical area being obtained by boring or honing the inner surface of the pipe.

7. The coupling construction according to claim 1, wherein the inner sleeve is provided with at least one circumferential outer groove containing a sealing ring, said at least one sealing ring being held compressed between the inner sleeve and the inner surface of the pipe.

8. The coupling construction according to claim 1, wherein a full radial outer surface of the inner sleeve outside any groove therein is defined by at least one cylindrical area which is devoid of uneven aspects such as ribs and/or ridges.

9. Process for forming a coupling construction according to claim 1, comprising the steps of:
providing two high pressure pipes each having a pipe wall which comprises a reinforcement layer of helically wound fibers,
providing a metallic force transfer fitting connected to a mounting means;
providing a metal outer sleeve onto the respective outer surface of the pipes,
providing a non-metallic inner sleeve onto the inner surface of the pipes, said inner sleeve comprising a plastic material and providing a sealing with respect to the respective inner surface of the pipes and extending through the metallic force transfer fitting and the mounting means;
providing a seal fitting held between the facing pipe ends and facing away from both pipes at an end of the mounting means;
wherein the metallic force transfer fitting is connected to at least one metallic outer sleeve and to the mounting means.

* * * * *